CIRCUIT ARRANGEMENT FOR RELAY CONTROLLED PBX INSTALLATIONS

Filed Sept. 10, 1962 6 Sheets-Sheet 1

March 22, 1966 W. STROBELT ETAL 3,242,266

CIRCUIT ARRANGEMENT FOR RELAY CONTROLLED PBX INSTALLATIONS

Filed Sept. 10, 1962 6 Sheets-Sheet 5

March 22, 1966 W. STROBELT ETAL 3,242,266

CIRCUIT ARRANGEMENT FOR RELAY CONTROLLED PBX INSTALLATIONS

Filed Sept. 10, 1962 6 Sheets-Sheet 5

United States Patent Office 3,242,266
Patented Mar. 22, 1966

3,242,266

CIRCUIT ARRANGEMENT FOR RELAY CONTROLLED PBX INSTALLATIONS

Walter Strobelt and Erwin Huber, Munich, and Andreas Friese, Gauting, Germany, assignors to Siemens & Halske Aktiengesellschaft, Berlin and Munich, Germany, a corporation of Germany Filed Sept. 10, 1962, Ser. No. 222,536
Claims priority, application Germany, Sept. 11, 1961, S 75,698
8 Claims. (Cl. 179—18)

The invention disclosed herein is concerned with a circuit arrangement for relay controlled private branch exchange installations, briefly referred to as PBX boards or systems, wherein a switching operation effected respectively at a station engaged in calling-back another station, or effected at a called-back station, initiates the transferring of an exchange line to the called-back station.

In known circuit arrangements for relay controlled PBX telephone systems, there are provided switching means, cooperating with the exchange transmission involved in a call, which switching means are operative, responsive to a transfer signal from a calling-back or called-back station or extension, respectively, to prepare the marking of the called-back station or extension by a coupling contact of the line coupler, which contact is closed for the calling-back connection.

The object of the invention is to carry out the marking of the called-back station, incident to the transferring of an exchange line, with the aid of central marker switching means provided respectively for internal house calls and exchange calls.

According to the invention, this is accomplished by allocating to an exchange transmission involved in a call, switching means which are affected by a transfer signal extended respectively from a calling-back or called-back station, and by the provision of a central device to be seized by the action of the transfer signal, for the identification of the called-back station and for controlling the exchange coupling relays of the called-back station.

This makes it in simple manner possible to seize the central device by the respective exchange connection and to carry out the identification of the called-back station at an instant at which the exchange coupling point of the called-back station is with certainty closed.

The various objects and features of the invention will appear from the description which is rendered below with reference to the accompanying drawings showing the details of an embodiment to the extent which is required for an understanding thereof.

Figure 1A:
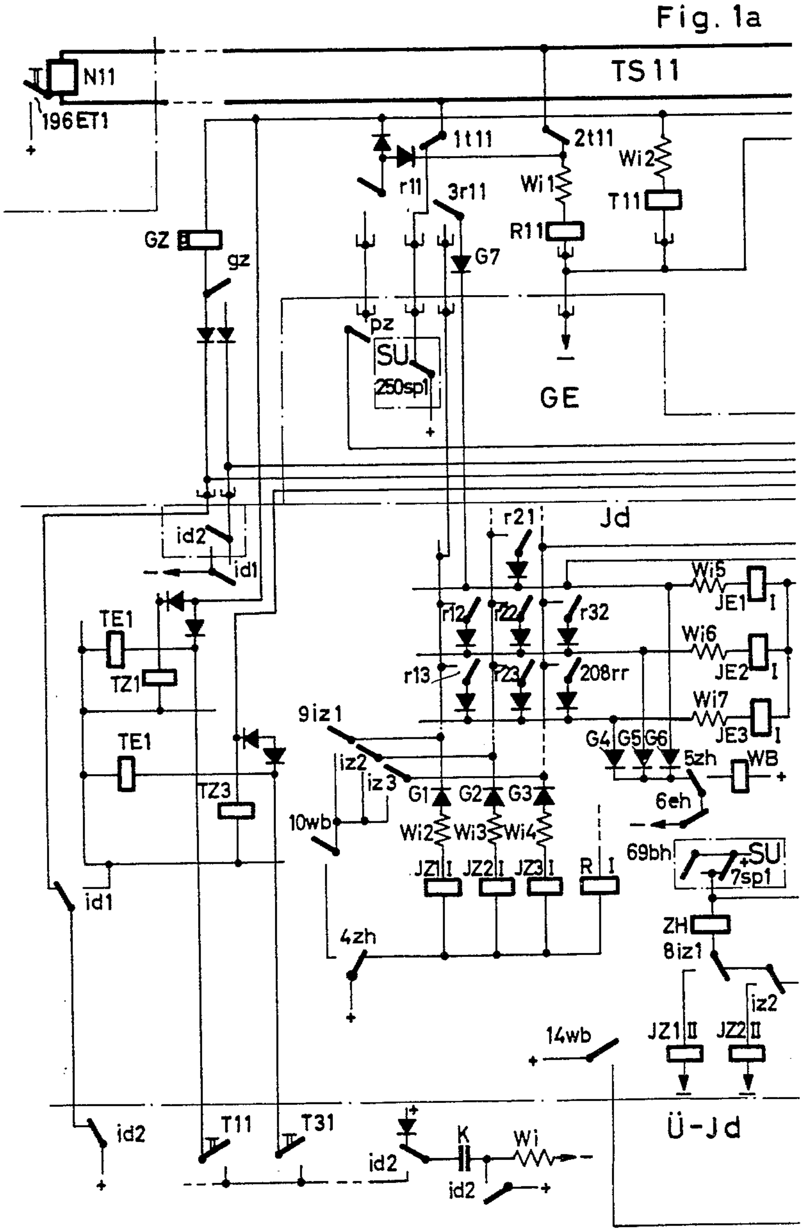
Figure 1B:
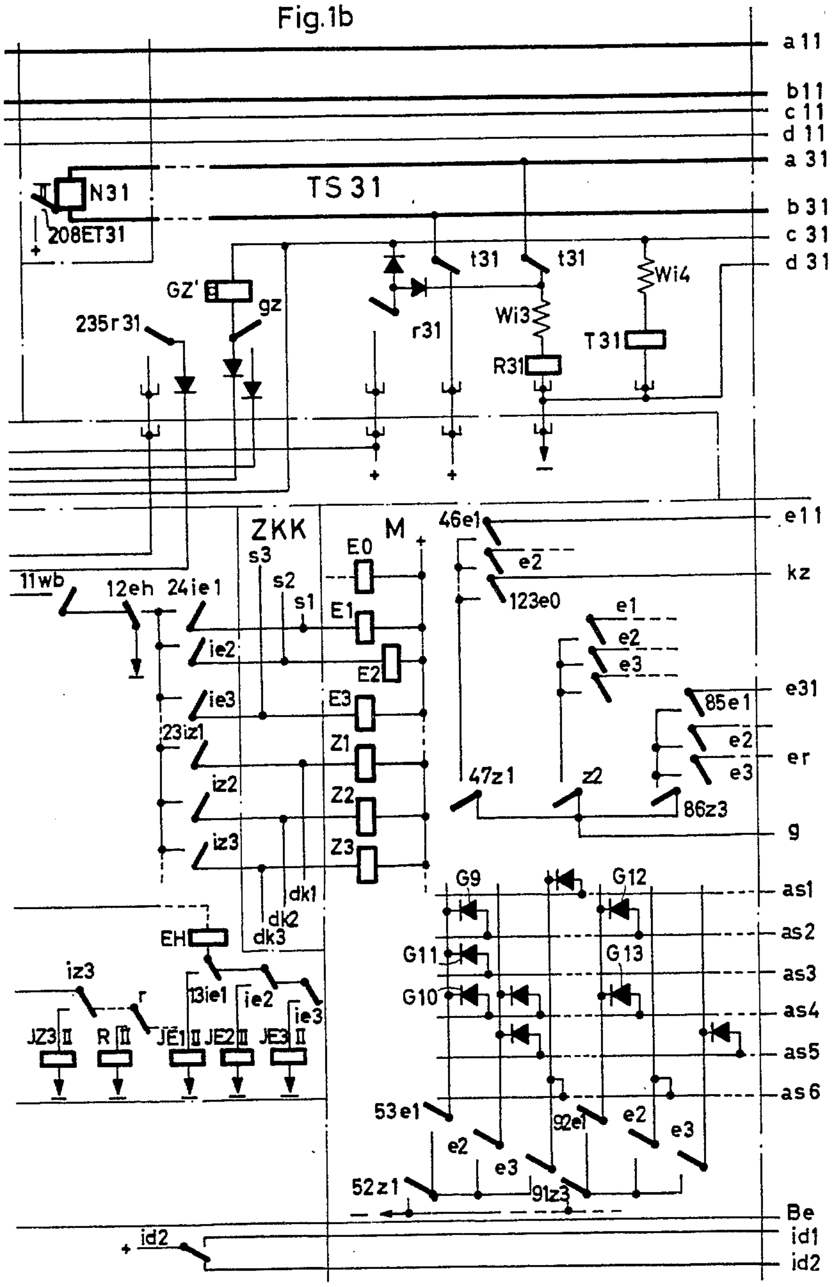
Figure 2A:
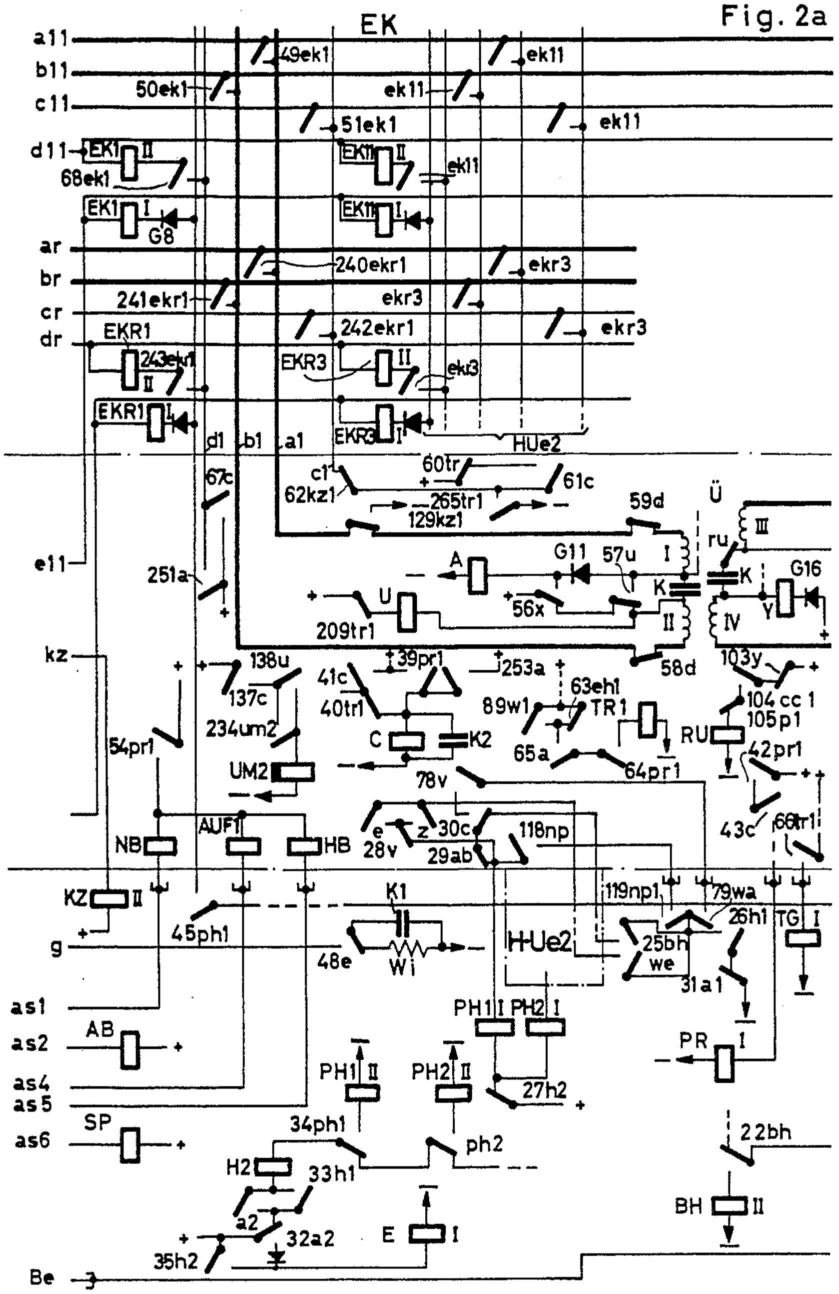
Figure 2B:
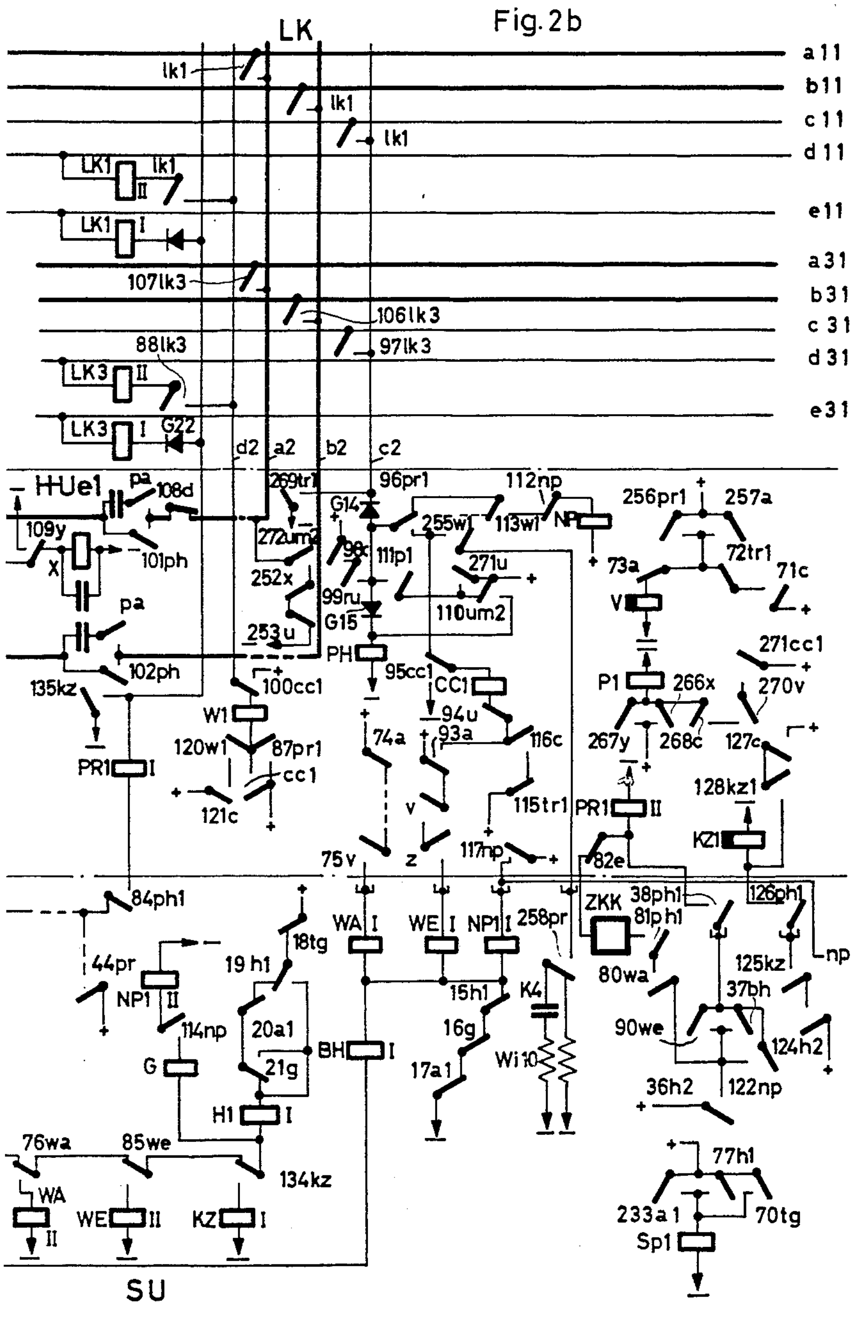
Figure 3A:
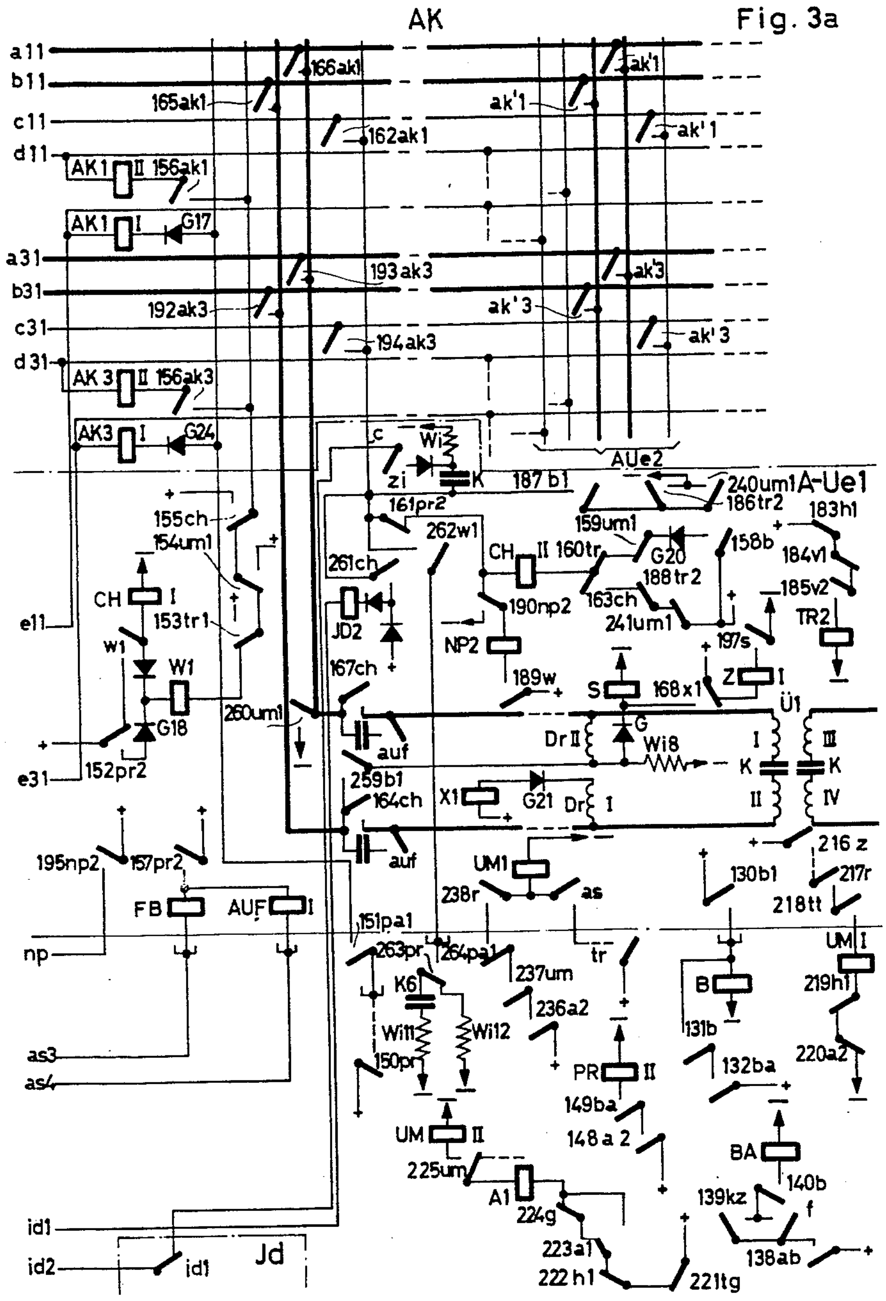
Figure 3B:
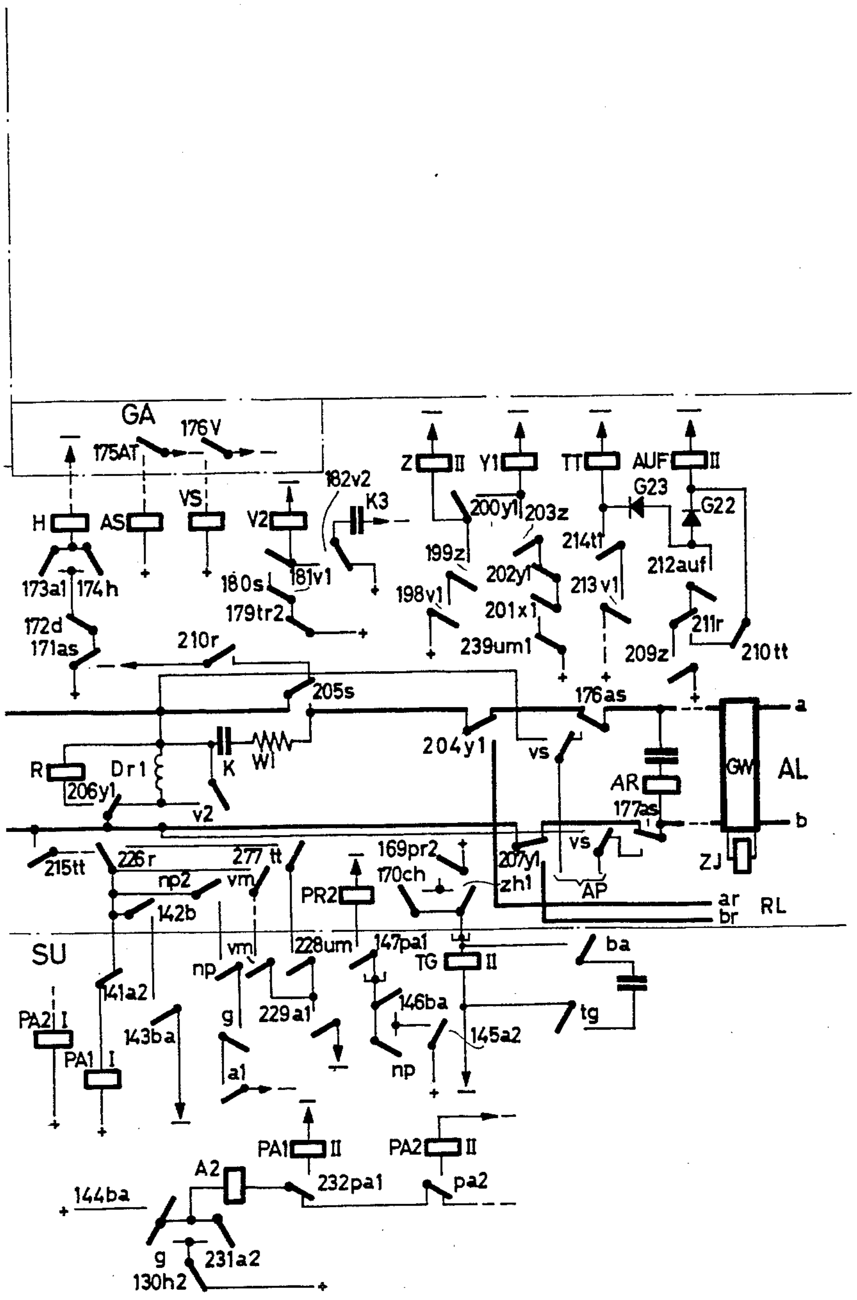

FIGS. 1*a* and 1*b* show the line circuits TS11 and TS31 of the stations N11 and N31 as well as the identification device *Jd*, the marker M and the transmission U–*Jd* of the identification device, also indicating a common device GE and a counting chain coupler ZKK;

FIGS. 2*a* and 2*b* illustrate the input coupler EK, the line coupler LK, the internal house transmission H–U*e*1 and part of the switching means of the finder SU which is common to all internal house transmissions and exchange transmissions; and FIGS. 3*a* and 3*b* represent the exchange coupler AK, the exchange transmission A–U*e*1 and the most important switching means of the finder SU which is common to all internal house transmissions and exchange transmissions.

(A) *Seizure of an Idle House Transmission, for example, H–Ue1, by the Calling Station N11.*—Removal of the receiver at the station N11, upon initiating a call, causes actuation of the line relay R11 included in the line circuit TS11:

(1) +, 250*sp*1, 1*t*11, N11, 2*t*11, W*i*1, R11, —

Closure of the contact 3*r*11 causes extension of a triggering signal to the identifying device J*d*, the contact 4*zh* of which is closed when the identifying device is idle. The triggering signal from the station N11 is in such a case received by the identifying device and the tens relay JZ1, marking the decade in which the calling station is located, will be actuated in the circuit:

(2) +, 4*zh*, JZ1(I), W*i*2, G1, 3*r*11, G7, G6, 5*zh*, 6*eh*, —

Since the contact 7*sp*1 in the finder SU is closed, the following holding circuit for the relay JZ1 will be completed:

(3) +, 7*sp*1, ZH, 8*iz*1, JZ1(II), —

Relay ZH is likewise actuated in this circuit. The contact 4*zh* marks the identifying device as being busy. A circuit is now closed for the relay WB:

(4) +, WB, 5*zh*, 6*eh*, —

Upon operative actuation of the relay JZ1, the relay JE1 which designates the unit position of the calling station, is now closed over the contacts 4*zh*, 9*iz*1 and contact 3*r*11:

(5) +, 4*zh*, 10*wb*, 9*iz*1, 3*r*11, G7, W*i*5, JE1(I), 11*wb*, 12*eh*, —

The relay JE1 is held operated in a circuit including contact 7*sp*1 of the finder SU, relay EH being likewise actuated in such circuit:

(6) +, 7*sp*1, EH, 13*ie*1, JE1(II), —

A seizure signal is by means of contact 14*wb* transmitted to the centrally disposed finder SU (FIGS. 2*a* and 2*b*). Assuming that this finder is idle, contacts 15*h*1, 16*g* and 17*a*1 will be closed and the seizure for busying relay BH thereof will be actuated:

(7) +(FIG. 1), 14*wb*, B*e*—conductor (FIG. 2*b*), BH(I), 15*h*1, 16*g*, 17*a*1, —

Relay H1 is now operatively connected in the circuit:

(8) +, 18*tg*, 19*h*1, 20*a*1, 21*g*, H1(I), 134*kz*, 85*we*, 76*wa*, 22*bh*, BH(II), —

Closure of contact 19*h*1 closes a holding circuit for the relays BH and H1:

(9) +, 18*tg*, 19*h*1, H1(I), 134*kz*, 85*we*, 76*wa*, 22*bh*, BH(II), —

Contact 77*h*1 effects operative connection of the relay S*p*1. Contact 250*sp*1 (FIG. 1*a*) prevents during the seizure of the finder SU extension to the identifying device, of a second triggering signal by the connection of a subscriber line relay over the station loop.

The circuit for relay WB (FIG. 1*a*) is interrupted after transmission of the seizure signal to the finder SU. The following circuits are closed over the contact 12*eh*, for the marking relays Z1 and E1 of the central marker M:

(10) +, . . ., Z1, 23*iz*1, . . ., 12*eh*, —

(11) +, E1, 24*ie*1, 12*eh*, —

Since the house transmission H–U*e*1 is idle, a testing circuit is now closed for the test relay PH1 (FIG. 2*a*) of the finder SU:

(12) +, 27*h*2, PH1(I), 29*ab*, 30*ch*, . . ., 25*bh*, 26*h*1, 31*a*1, —

The following holding circuit, in which is also included the relay H2 (FIG. 2*a*), is now closed for the relay PH:

(13) +, 32*a*2, 33*h*1, H2, 34*ph*1, PH1(II), —

The operative connection of relay H2 effects energization of the relay E1 of the finder SU, in a circuit:

(14) +, 35*h*2, E1(I), —

The relay PR1 of the house transmission H–U*e*1 is likewise energized, thereby initiating the seizure of the transmission H–U*e*1, in a circuit:

(15) +, 36*h*2, 37*bh*, 38*ph*1, PR1(II), –

The seizure or busying relay C of the house transmission H–U*e*1 (FIGS. 2*a* and 2*b*) is now energized in a circuit:

(16) +, 39*pr*1, C, –

Relay C is held energized in the circuit:

(17) +, 41*c*, 40*tr*1, C, –

The relay PR (FIG. 2*a*) is energized by the closure of contact 43*c*, in the circuit:

(18) +, 42*pr*1, 43*c*, PR(I), –

Since the house transmission H–U*e*1 is now seized and since the contacts of the relays PR and PH1, in the finder SU, are closed, the calling station N11 will be marked by the contacts of the relays Z1 and E1 of the marker M (FIG. 1*b*), and an idle coupling relay, for example, EK1 (FIG. 2*a*) is actuated so as to connect the station N11 (FIG. 1*a*) with the idle house transmission H–U*e*1 (FIGS. 2*a* and 2*b*), in a circuit:

(19) +(FIG. 2), 44*pr*, 45*ph*1, G8, EK1(I), *e*11—conductor (FIG. 1), 46*e*1, 47*z*1, g—conductor (FIG. 2), 48*e*, K1, –

The station N11 (FIG. 1*a*) is now connected with the house transmission H–U*e*1 (FIGS. 2*a* and 2*b*), over the contacts 49*ek*, 50*ek* and 51*ek* of the coupling relay EK1 (FIG. 2*a*). A holding circuit for the coupling relay EK1 is closed over the winding II thereof:

(20) +(FIG. 2*a*), 67*c*, 68*ek*1, EK1(II), *d*11—conductor (FIG. 1*b*), –

The call authorization of the calling station (extension) N11 (FIG. 1*a*) is marked by the contact 52*z* (FIG. 1*b*) of the tens relay Z1 and contact 53*e*1 of the units relay E1, incident to the marking of such station for the switching through of the call to the house transmission H–U*e*1 (FIGS. 2*a* and 2*b*), over the coupler EK (FIG. 2*a*). The authorization marking is effected by jumper wires placed in the variable marker field which is indicated in connection with the marker M (FIG. 1*b*).

If the station or extension line N11 is, for example, authorized for making exchange calls, toll calls and to switch itself into connections the following circuits will be produced upon seizure of the house transmission H–U*e*1 (FIGS. 2*a* and 2*b*) and upon actuation of the marker relays Z1 and E1 (FIG. 1*b*) of the marker M, namely:

(21) –(FIG. 1*b*), 52*z*1, 53*e*1, G9, *as*2—conductor (FIG. 2), AB, +

(22) –(FIG. 1*b*), 52*z*1, 53*e*1, G10, *as*4—conductor (FIG. 2*a*), AUF1, 54*pr*1, +

The relay AB (FIG. 2*a*) marks, in the finder SU, the authorization for exchange calls (outside calls) of the extension N11. The relay AUF1 marks, in the house transmission H–U*e*1, the authorization for switching the extension N11 unto existing calls. The relay AB remains connected only for the duration of the evaluation and the relay AUF1 remains connected in the house transmission in a manner not shown in the drawing.

The connection of the extension station N11 (FIG. 1*a*) with the house transmission H–U*e*1 (FIGS. 2*a* and 2*b*), over the input coupler EK (FIG. 2*a*) effects the energization of the battery feed relay A of the transmission H–U*e*1, in a circuit:

(23) +(FIG. 2), 56*x*, 57*u*, Ü(II), 58*d*, 50*ek*1, *b*11—conductor, (FIG. 1*b*), N11, *a*11—conductor (FIG. 2*a*), 49*ek*1, 129*kz*1, 59*d*, Ü(I), G11, A, —

The relays C and EK1 are held operated respectively over the contacts 253*a* and 251*a*. The dial tone is now in a suitable manner, not shown, transmitted inductively to the calling party at the extension N11 (FIG. 1*a*). The cutoff relay T11 of the station line circuit is energized in a circuit:

(24) +(FIG. 2*a*), 60*tr*, 61*c*, 62*kz*1, 51*ek*1, *c*11—conductor (FIG. 1*b*), W*i*2, T11, –

The circuit 1 for the relay R11 is interrupted by the opening of the contacts 1*t*11 and 2*t*11 (FIG. 1*a*).

The relay TR1 (FIG. 2*a*) in the house transmission H–U*e*1 (FIGS. 2*a* and 2*b*) is now actuated, after completing the connection of the extension N11 (FIG. 1*a*) to the house transmission H–U*e*1 (FIGS. 2*a* and 2*b*), in a circuit:

(25) +, 63*eh*1, 65*a*, 64*pr*1, TR1, –

Relay TG in the finder SU (FIG. 2*a*) is operatively connected over the closed contact 66*tr*1, in a circuit:

(26) +, . . ., 66*tr*1, TG(I), –

The energization of the relays TR1 and TG initiates the release of the seized central device, that is, the finder SU, the marker M (FIGS. 2*a* and 2*b*) and of the identification device JD. Accordingly, the central devices remain occupied only up to the instant when the extension station N11 is connected with the idle house transmission H–U*e*1.

The holding circuit 9 for the relays BH and H1 are interrupted at the contact 18*tg*. Opening of the contact 33*h*1 disconnect the relays PH1 and H2 (circuit 13). The circuit 14 for the relay E1 and the circuit 15 for the relay PR1 are likewise interrupted. The circuit 18 for the relay PR of the finder SU is interrupted by the opening of the contact 42*pr*1. The authorization relay AB (circuit 21) is also disconnected. In the finder SU (FIGS. 2*a* and 2*b*), the relay S*p*1 (FIG. 2*b*) which had been operatively connected by the relay H1, is held in the following circuit, namely:

(27) +, 70*tg*, S*p*1, –

The contact 7*sp*1 in the finder (FIG. 1*a*) is accordingly opened and the contact 69*bh* (FIG. 1*a*) is in normal position, so that the circuits 3 to 6 for the relays ZH, JZ1, EH and JE1 (FIGS. 1*a* and 1*b*) are interrupted. The identifying device J*d* (FIGS. 1*a* and 1*b*) is released for the receipt of a new triggering signal by the restoring contacts 5*zh* and 6*eh*. The relays Z1 and E1 (circuits 10 and 11) of the marker M are likewise disconnected. The marker M is free again for another operation.

The relay TR1 in the house transmission H–U*e*1 (circuit 25) is disconnected by the opening of contact 64*pr*1. The circuit 26 for relay TG is interrupted. Contact 70*tg* disconnects the relay S*p*1 (circuit 27). The finder SU is now again available for another call. Station line relays can again be operatively connected over contact 250*sp*1 (FIG. 1*a*).

There are now energized, in the station line circuit TS11, the cutoff relay T11 (FIG. 1*a*) and in the coupler EK (FIG. 2*a*), the relays A and C. The extension station N11 receives the dial tone in suitable not illustrated manner.

(B) *Selection of the Extension Line N31 by the Party at the Extension N11 for Extending a House Call.*—It shall now be assumed that the party at the extension station N11 dials the number 31 of the station N31 so as to obtain a connection therewith. The dialed selection impulses are transmitted to the relay A (FIG. 2*a*), such relay operatively responding thereto in impulsing manner (circuit 23). The dial tone is disconnected in known manner responsive to the first deenergization of relay A, and the relay V of the house transmission is energized in the circuit:

(28) +, 71*c*, 72*tr*1, 73*a*, V, –

A seizure signal is again transmitted to the finder SU and such finder, if marked as being idle, by the contacts 15*h*1 and 17*a*1, is busied. The relay WA of the finder SU is now energized in the circuit:

(29) +, 74*a*, 75*v*, WA(I), 15*h*1, 16*g*, 17*a*1, —

The following holding circuit for the relay WA is now established over the winding II thereof, relay H1 being also included in such circuit:

(30) +, 18*tg*, 19*h*1, 20*a*1, 21*g*, H1(I), 134*kz*, 85*we*, 76*wa*, WA(II), —

The relays WA and H1 are held operated in the following circuit:

(31) +, 18*tg*, 19*h*1, H1(I), 134*kz*, 85*we*, 76*wa*, WA(II), —

The relay Sp1 is energized over contact 77*h*1 and the identifier Jd is released by the actuation of contact 7*sp*1 (FIG. 1*a*):

(32) +, 77*h*1, Sp1, —

The contact 250*sp*1 (FIG. 1*a*) prevents operative connection of a station line relay.

The relay PH is energized responsive to closure of contacts 26*h*1 and 79*wa*, in the circuit:

(33) +, 27*h*2, PH1(I), 29*ab*, 30*c*, 78*v*, 79*wa*, 26*h*1, 31*a*1, —

The holding circuit 13 for the relay PH1 is now restored again, relay H2 being included in such holding circuit. The relay E1 (FIG. 1b) is energized in the circuit 14.

The relay PR1 of the house transmission H–U*e*1 (FIGS. 2*a* and 2*b*) is energized over the connection- and seizure-circuit of a counting chain coupler ZKK (FIG. 2*b*):

(34) +, 36*h*2, 80*wa*, 81*ph*1, ZKK, 82*e*, PR1(II), —

Since contact 63*eh*1 is opened for the indication of the occupation of the house transmission HU*e*1, the relay IR1 is not energized. The relay PR is energized in circuit 18.

The counting chain coupler ZKK is constructed in known manner and such coupler, the details of which are unimportant for the invention, is therefore merely schematically indicated in FIG. 2*b*. The seizure of the counting chain coupler ZKK connects the house transmission H–U*e*1 in not illustrated manner with a counting chain. The finder at SU is not yet released after marking its connection in the connection set VS, by the energization of the relay P*r*1. The selection impulses are transmitted to the counting chain by the actuation of a contact of the relay A, which contact is not shown. The finder at SU is connected after each first impulse. Upon conclusion of the selection (which is marked in the house transmission H–U*e*1), the finder SU is again operatively connected for the setting of the marker and the counting chain coupler, respectively. The seizure of the marker M (FIG. 1*b*) takes place in not illustrated manner by the action of the finder SU (FIGS. 2*a* and 2*b*) over the counting chain coupler ZKK (FIG. 1*b*). The marking of the selected digits is transmitted to the marker M (FIG. 1*b*). This effects connection, in the marker M, of the relays E1 and Z3 respectively over the conductors *s*1 and *dk*3.

The central control is during the impulsing and for the intermediate selection intervals, available for other operations, since the finder SU is released after each connection of the counting chain and is again seized incident to each first impulse of an impulse series. After the selection of the last digit and signalling of the selection conclusion, the following relays of the finder SU will be actuated, namely, relays H1, Sp1, PH1, H2, E1 and WE.

The following relays are among others actuated in the house transmission H–U*e*1, namely, relays C, V and A. Contacts controlled by relays Z and U1 (not shown) are likewise closed in the house transmission H–U*e*1.

Contacts controlled by a relay EH1 (not shown) are likewise operated. The relay WE is energized, in a manner not illustrated, after the end of a selector impulse series. The holding circuit for the relays WE and H1 is in the following circuit:

(35) +, 18*tg*, 19*h*1, H1(I), 85*we*, WE(II), —

The relay WA is disconnected through the operation of contact 85*we*.

The desired extension station N31 is now marked by the relays E1 and Z3 of the marker M, and the coupling relays LK3 (FIG. 2*b*) of the line coupler LK are energized in the circuit:

(36) +(FIG. 2*b*), 44*pr*, 84*ph*1, PR(I), G22, LK3(I), *e*31—conductor (FIG. 1*b*), 85*e*1, 86*z*3, *g*—conductor (FIG. 2*a*), 48*e*, K1, —

The energization of the coupling relay LK3 takes place through the charging current of condenser K3.

The line coupling relay LK3 (FIG. 2*b*) is held operated in the following circuit, in which is also included the relay W1 of the house transmission H–U*e*1, namely:

(37) +(FIG. 2), 87*pr*1, W1, 100*cc*1—conductor, 881*k*3, LK3(II), *d*31—conductor (FIG. 1), —

The circuit 37 is activated only if the called station NE1 is free and the relay CC1 is energized over the *c*1-lead.

In order to mark the authorization of the called line N31 (FIG. 1*b*), there will be actuated, incident to the marking of the called line in the line coupler LK (FIG. 2*b*) the authorization relay AB (outside of exchange calls) of the finder (FIGS. 2*a* and 2*b*) and an authorization relay energized corresponding to the authorization relay AUF1 (authorized to cut in):

(38) —(FIG. 1*b*), 91*z*3, 92*e*1, G12, *as*2—conductor (FIG. 2*a*), AB, +

(39) —(FIG. 1*b*), 91*z*3, 92*e*1, G13, *as* 4+conductor (FIG. 2*a*), the relay corresponding to relay AUF1, 54*pr*1, +

The relay corresponding to the relay AUF1 is held in a manner not illustrated since the calling extension line N11 is also authorized to cut in on existing calls. The relay AUF1 prevents, for example, the cutting in of third parties. The connection of the call between the lines N11 and N31 (FIGS. 1*a* and 1*b*) is now prepared over the input coupler EK or the line coupler LK (FIGS. 2*a* and 2*b*), and the release of the seized central devices can therefore be initiated. This is effected by the contact 89*w*1 and energization of relay TR1 (FIG. 2*a*) of the house transmission H–U*e*1:

(40) +, . . ., 89*w*1, 65*a*, 64*pr*1, TR1, —

The relay TG of the finder SU is energized in the circuit 26. The circuit 35 for the relays H1 and WE is interrupted at contact 18*tg*. A contact of the relay TG also effects in not illustrated manner the release of the counting chain coupler ZKK and therewith release of the marker M (FIG. 1*b*). Relays Z3 and E1 of the marker M are disconnected. The authorization relay AB of the finder SU is likewise restored. The relays PH1 and H2 (circuit 13) are disconnected. Opening of the contact 36*h*2 effects disconnection of the relay PR1 of the house transmission H–U*e*1, which latter relay had been energized over the contact 90*we*. The contact 42*pr*1 of the house transmission H–U*e*1 interrupts the circuit 13 for the relay PR. The circuit 40 for relay TR1 is interrupted by the opening of the contact 64*pr*1. The relay TG (circuit 26) of the finder SU is interrupted by the contact 66*tr*1.

There are now operated, the cutoff relay T11 in the line circuit TS1 (FIG. 1*a*), in the house transmission H–U*e*1 (FIGS. 2*a* and 2*b*), among others, the relays C and A, and also the input coupling relay EK1 and the line coupling relay LK3.

(C) *The Called Extension Line N31 Is Idle.*—It shall now be assumed that the extension line or station N31 is idle. Since there is no ground potential on the conductor *c*2 (FIG. 2*b*) of the called line, the relay CC1 (FIG. 2*b*) of the house transmission H–U*e*1 will in such case be operatively connected over the contacts 93*a*, 94*u*, 95*cc*1, 255*pr*1 and 285*pr*, by the discharge of the capacitor K4 (FIG. 2*b*), in the circuit:

(41) +(FIG. 2*b*), 93*a*, 94*u*, CC1, 95*cc*1, 255*w*1, 258*pr*, K4, W*i*10, —

The following holding circuit is established in the house transmission H–U*e*1, for the relay CC1, namely:

$$+, \frac{115tr1, 116c}{93a}, 94u, \text{CC1}, 95cc1, -$$

Relay P1 is energized over contacts 271*cc*1, 270*v* and 268*c*. A circuit is established for the ringing relay RU:

(43) +, 103*y*, 104*cc*1, 105*p*1, RU, —

The relay W1 (circuit 37) is disconnected. The coupling relay LK3 is held operated over the circuit:

(44) +FIG. 2*b*, 100*cc*1, *d*2—conductor, 881*k*3 LK3(II), *d*31—conductor (FIG. 1*b*), —

The relay PH is energized in the circuit:

(45) +, 98*c*, 99*ru*, G15, PH, —

Blocking ground is preparatorily connected to the conductor *c*2 by the actuation of contacts 98*c* and 99*ru*. The cutoff relay T31 of the called station is consequently held energized in the circuit:

(46) +(FIG. 2*b*), 98*c*, 99*ru*, G14, *c*2—conductor, 971*k*3, *c*31—conductor (FIG. 1*b*), W*i*4, T31, —

The station N11 is connected with the station N31 by the closure of contacts 101*ph* and 102*ph*. Ringing signal is transmitted to the station N31 over not illustrated contacts of the ringing relay RU. When the party on the called line N31 answers, relay Y will be energized over the line loop and will be held over the line loop in the following circuit:

(47) +(FIG. 2), G16, Y, Ü(IV), 102*ph*, *b*2—conductor, 1061*k*3, *b*31—conductor (FIG. 1), N31, *a*31—conductor (FIG. 2), 1071*k*3, *a*2 —conductor, 108*d*, 101*ph*, Ü(III), 109*y*, —

Relax X in FIG. 2*b* is not energized upon energization of the relay Y. The circuit 43 for the relay RU is interrupted at contact 103*y* and the transmission of ringing current ceases. Relay P1 is held operated over the contact 267*y*. The following holding circuit is established for the cutoff relay T31:

(48) +(FIG. 2), 110*um*, 111*p*1, G14, *c*2—conductor 971*k*3, *c*31—conductor (FIG. 1), W*i*4, T31, —

Relay PH is held operated over the contact 111*p*1, in the circuit:

(49) +, 110*um*, 111*p*1, G15, PH, —

There are now actuated the cutoff relays T11 and T31 in the line circuits TS11 and TS31 (FIGS. 1*a* and 1*b*), the coupling relays EK1 and LK3 (FIGS. 2*a* and 2*b*), and in the house transmission H–U*e*1, the relays C, A, CC1, P1, PH, V and Y.

In case the calling party N11 restores the receiver first, at the conclusion of the call, the circuit 23 for the relay A (FIG. 2*a*) is interrupted, initiating the release of the call. Busy tone is in not illustrated manner transmitted to the called party at the station N31. Relay TR1 is operatively connected in not illustrated manner when the called party restores the receiver. Opening of the contact 40*tr*1 interrupts the circuit 17 for the relay C which releases with some delay, due to the action of the capacitor K2 connected in parallel therewith. Contact 265*tr*1 produces an impulse which initiates, over the conductor *c*11, a rechecking or re-testing operation with respect to the calling station N11, and contact 269*tr*1 produces an impulse for initiating, over the conductor *c*31, a rechecking or re-testing operation with respect to the line N31. As will be described under the heading D, this impulse connects in a transmission used for a connection to station N11, when busy, eenrgization of the relay NP which initiates the rechecking or re-testing of the line N11 when such line becomes idle. The relay TG of the finder is energized over the contact 66*tr*1, so as to reserve such finder for operation in connection with a line that may be in waiting position for a call. The relay CC1 (circuit 42) is disconnected by the contacts 93*a* and 116*c*. Opening of the contact 67*c* interrupts the holding circuit 20 for the coupling relay EK1. Contact 61*c* (circuit 24) disconnects the cutoff relay T11 in the line circuit TS11. The circuit 44 for the line coupling relay LK3 (FIG. 2*b*) is interrupted by contact 100*cc*1. The restoration of the line coupling relay LK3 effects disconnection of the relay Y (circuit 47) and of the cutoff relay T31 in the line circuit TS31 (FIG. 1*b*). Relay P1 and therewith relay PH (circuit 49) are likewise disconnected. The line circuits TS11 and TS31 (FIGS. 1*a* and 1*b*) and the house transmission H–U*e*1 (FIGS. 2*a* and 2*b*) as well as the coupling relays EK1 and LK3 are again at normal and ready for another call. The relay TR1 and therewith the relay TG of the finder are restored to normal. The finder is now available for reuse and preferentially for use in connection with a call to be extended from a waiting line.

In the event that the receiver is first restored at the line N31 (FIG. 1*b*), the relay Y (circuit 47) is restored. The circuit 49 for the relay PH (FIG. 2*a*) and the circuit 48 for the cutoff relay T31 (FIG. 1*b*), are interrupted. The busy tone is transmitted to the calling line N11. When the receiver is at this line replaced, the relays A, C, CC1, P1 and the not illustrated relay V in the house transmission H–U*e*1 (FIGS. 2*a* and 2*b*) will be restored and the cutoff relay T11 (FIG. 1*a*) is disconnected. The relay TR1 is in not illustrated manner energized and impulses for initiating the re-testing are transmitted in accordance with the operations described above, and the finder SU is briefly busied and thereupon released.

(D) *The Called Line N31 Is Busy.*—It shall now be assumed that the extension line N31 is busy. The marking of a line as being busy is in known manner effected by connecting, in the house transmission, plus potential on the conductor *c*31. The connection of this potential prevents discharge of the capacitor K4 over the CC1 relay in FIG. 2*b* of the house transmission. The relay CC1 is not energized. The relay NP is over contacts 113*w* and 96*pr*, after disconnection of the relay PR1 upon the release of the finder SU, connected to the conductor *c*2. The line coupling relay LK3 and the relay W1 are held operated over the contacts 102*w*1 and 121*c*, in a circuit:

(50) +(FIG. 2), 121*c*, 120*w*1, W1, 100*cc*1, 881*k*3, LK3(II), *d*31 (FIG. 1), —

The relay NP is not connected over the relay PH. The busying ground is disconnected from the conductor *c*31 when the line N31 becomes idle, and the relay NP is operatively connected responsive to the operations taking place as previously described, responsive to the re-testing impulse transmitted from the house transmission over the conductor *c*31, the energization of relay NP being effected over a circuit:

(51) +(FIG. 2), NP, 112*np*, 113*w*, 96*pr*1, G14, *c*2—conductor 971*k*3, *c*31—conductor (FIG. 1), . . . , —

A seizure impulse is transmitted to the finder SU over the contact 117*np*, in a circuit:

(52) +, 117*np*, NP1(I), 15*h*1, 16*g*, 17*a*1, —

The following holding circuit is after the connection of relay H1 established for the relay NP1 of the finder SU, over the contact **20*a*1**:

(53) +, **18*tg*, 19*h*1, H1(I), G, 114*np***, NP1(II), —

Relay PH1 is energized in the circuit:

(54) +, **27*h*2, PH1(I), 118*np*, 119*np*1, 26*h*1, 31*a*1**, —

The holding circuit 13, in which is also included the relay H2, is established for the relay PH1. The relay E1 is connected in the circuit 14. For the relay PR1 is established a circuit:

(55) +, **36*h*2, 122*np*, 38*ph*1**, PR1(II), —

The circuit 18 is established for the relay PR. The relay NP (circuit 51) is interrupted again and the circuit 41 is established for the relay CC1. The further operations, that is, the release of the finder SU are initiated by the energization of the relay TR1 (circuit 40) and the switching through is effected in accordance with the operations effected by circuits 41 to 49, already described under the heading C. The release has also been described under the heading C.

(E) *Extension of an Outgoing Exchange Call From the Line N11*.—The connection of the line N11 with an idle house transmission, for example, H–U*e*1, is effected in accordance with the circuits 1 to 27, described under the heading A. Upon dialing at the line N11 the exchange code number, for example, number 10, the relays Z1 and EO will be operatively connected in the marker M, by the operations described under the heading B, involving the counting chain coupler ZKK (FIG. 1*b*). In the house transmission H–U*e*1 (FIGS. 2*a* and 2*b*), there are at such time relays PR1, C, V, A energized, the contacts of the not illustrated relays Z1 and EH1 are actuated, and in the finder SU are energized the relays H1, S*p*1, PH1, H2, E1, PR and WE.

The exchange marking relay KZ of the finder SU (FIGS. 2*a* and 2*b*) is now by actuation of the relays Z1 and EO (FIG. 1*b*) energized over the exchange marking conductor *kz*, in the circuit:

(56) +(FIG. 2), KZ(II), *kz*—conductor (FIG. 1), **123*eo*, 47*z*1**, *g*—conductor (FIG. 2), **48*e***, K1, —

The relay KZ interrupts the circuit 35 for the relay WE, and holds itself operated in the circuit:

(57) +, **18*tg*, 19*h*1, H1(I), 134*kz***, KZ(I), —

The following circuit is established for the relay KZ1 of the house transmission H–U*e*1:

(58) +, **124*h*2, 125*kz*, 126*ph*1**, KZ1, —

The relay KZ is held in operated position over the circuit:

(59) +, **127*c*, 128*kz*1**, KZ1, —

The circuit 24 for the relay T11 is interrupted at the contact **62*kz*1. The relay R11 is energized over contact 129*kz*1** and the conductors *a*1 and *a*11. The contact **129*kz*1 interrupts the circuit 23** for the relay A of the house transmission H–U*e*1. The circuit 25 for the relay TR1 cannot be established because the relay A is disconnected prior to the relay EH1. The circuit 28 for the relay V is interrupted by the disconnection of relay A. The relays Z1 and EH1 (not illustrated) are likewise disconnected. The relay C and the relay PR (circuit 18) are also disconnected and the circuit 59 for the relay KZ1 is interrupted. The house transmission H–U*e*1 is released again.

The circuits 2 to 11 are established again by the momentary energization of the line relay R11 (FIG. 1*a*). The corresponding operations are described under the heading A. The relays ZH, JZ1, EH, JE1 and WB (FIG. 1*b*) of the marker M are energized. No further line relay such as R11 can be energized at this instant because of the circuit for the relay S*p*1 of the finder SU which extends over the contact **77*h*1. The contact 250*sp*1** (FIG. 1*a*) is open.

The operations incident to the marking of the line N11, by the contacts of the relays E1 and Z1 of the marker M also effect operative actuation of the relay AB in the circuit 21, for marking the exchange authorization of the line N11.

If the line N11, at which the exchange code number had been dialed, is not authorized to extend outside (exchange) calls, the relay AB will not be energized, and the corresponding line (N11) is again connected with an idle house transmission, for example, H–U*e*1, in accordance with the operations described under the heading A.

In the event that the line N11 is authorized to make outside calls (exchange calls), and provided that there is an exchange transmission, for example, the exchange transmission A–U*e*1 (FIGS. 3*a* and 3*b*) idle, the contact **130*b*1** (FIG. 3*a*) will be closed, and the relay B (FIG. 3*a*) of the finder SU will energize over the contact **130*b*1** in the circuit:

(60) +, **130*b*1**, B, —

The relay BA (FIG. 3) of the finder SU is energized, since the relay KZ (circuit 57) in the finder SU (FIGS. 2*a* and 2*b*) is energized, and since the authorization relay AB is again energized owing to the renewed identification of the line N11 and the relays Z and E (FIG. 1*b*) of the marker M, the energization of the relay BA being effected in the circuit:

(61) +, **138*ab*, 139*kz*, 140*b***, BA, —

A holding circuit is established for the relay B, namely, circuit:

(62) +, **132*ba*, 131*b***, B, —

A circuit is established over the idle exchange transmission A–U*e*1 for the relay PA1, namely, the circuit:

(63) +, PA1 (I), **141*a*2, 142*b*, 143*ba***, —

A holding circuit is completed for the relay PA1, in which is also included the relay A2, namely, the circuit:

(64) +, **144*ba*, A2, 232*pa*1**, PA1 (II), —

The circuit 13 for the relays PH1 and H (FIG. 2) is interrupted at the contact **32*a*2**. The relay E is held operated in the holding circuit:

(65) +, **32*a*2**, rectifier, E (I), —

The relay PR2 in the exchange transmission A–U*e*1 (FIGS. 3*a* and 3*b*) is now energized in the circuit:

(66) +, **145*a*2, 146*ba*, 147*pa*1**, PR2, —

The relay B1 (not illustrated) in the exchange transmission A–U*e*1 (FIGS. 3*a* and 3*b*) is disconnected, and the seizure or busying circuit 63 is interrupted at the contact **142*b***. The relay PR of the finder SU is energized over the winding II, in the circuit:

(67) +, **148*a*2, 149*ba***, PR (II), —

The following circuit is established for the exchange coupling relay AK1:

(68) + (FIG. 3), **150*pr*, 151*pa*1**, G17, AK1 (I), *e*11—conductor, (FIG. 1), **46*e*1, 47*z*1**, *g*—conductor (FIG. 2), **48*e***, K1, —

The exchange coupling relay AK1 is held actuated over its winding II in the circuit:

(69) + (FIG. 3), **152*pr*2, G18, W, 153*tr*1, 154*um*1, 155*ch*, 156*ak*1**, AK1 (II), *d*11—conductor (FIG. 1), —

The relay W is likewise included in this circuit.

Coincident with the switching through of the line N11 to the exchange transmission A–U*e*1, are energized the relays FB and AUF for marking the toll call authorization and the cutting-in of the line N11, the circuits involved being:

(70) + (FIG. 1), 52z1, 53e1, G11, as3—conductor (FIG. 3), FB, 157pr2, —

(71) + (FIG. 1), 52z1, 53e1, G10, as4—conductor (FIG. 3), AUF, 157pr2, —

The relay AB for the marking of the cutting-in authorization is, as already described, energized in the circuit 21.

The relay CH (FIG. 3*a*) of the exchange transmission A–Ue1 is energized responsive to the discharge current surge of the capacitor K6 over the contacts 263pr, 262w1, 161pr2 and 158b, the circuit involved being circuit:

(72) + (FIG. 3), 158b, G20, 159um1, 160tr, CH (II), 161pr2, 262w1, 263pr, K6, Wi11, —

The relay CH (FIG. 3*a*) is held operated in the following circuit, in which the relay T11 is included, namely, the circuit:

(73) + (FIG. 3), 241um1, 188tr2, 163ch, CH (II), 161pr2, 162ak1, c11—conductor (FIG. 1), Wi2, T11, —

Since the line conductors a11 and b11 are connected through to the line N11, relay X is actuated in the circuit:

(74) + (FIG. 3), X1, G21, Dr (I), . . . 164ch, 165ak1, b11—conductor (FIG. 1), N11,, a11—conductor (FIG. 3), 166ak1, 167ch, Dr (II), Wi8, —

Relay S of the exchange transmission A–Ue1 is now energized in the circuit:

(75) +, 168x1, S, —

The actuation of contact 155ch effects disconnection of the relay W. The following circuit is established for the energization of the coupling relay AK1:

(76) + (FIG. 3), 155ch, 156ak1, (II), d11—conductor (FIG. 1), —

The release of the seized central device, that is, the finder SU (FIGS. 2 and 3) and the marker M (FIG. 1*b*) as well as the identifying device Jd (FIG. 1*b*), is initiated by the relay TG of the finder SU (FIGS. 3*a* and 3*b*) which energizes in the circuit:

(77) +, 169pr2, 170ch, TG (II), —

The relay Sp1 (FIG. 2*b*) is energized in the circuit 27.

There are now successively released, in the finder SU, the relays KZ and H1 (circuit 57), the relays BA and B (circuits 61 and 62), the relays PA1 and A2 (circuit 64), the relay E1 (circuit 65) and the relay PR (circuit 67), and in the exchange transmission A–Ue1 (FIGS. 3*a* and 3*b*), the relay PR2 (circuit 66), finally, in the finder SU, and the relay TG. The finder SU is now again available for another call.

A release signal is also transmitted to the counting chain coupler ZKK and the relays Z1 and E1 in the marker M (FIG. 1) are consequently released in a manner not shown in detail. The circuits 21 and 70 for the relays AB and FB, which marked the exchange authorization of the line N11, are interrupted. The authorization relays AUF and FB remain for the time being, in not illustrated manner, energized. The relays ZH, JZ1, EH, JE1 and WB, in the identifier Jd (FIGS. 1*a* and 1*b*) are released due to restoration of the contact 69bh and opening of the contact 7sp1.

The line N11 (FIG. 1*a*) is now connected with the exchange line AL (FIG. 3*b*).

The following relays are energized: In the line circuit TS11 (FIG. 1*a*), the cutoff relay T11; in the exchange coupler AK (FIG. 3*a*), the exchange coupling relay AK1; in the exchange transmission A–Ue1 (FIGS. 3*a* and 3*b*), the relays CH, X1, S and the relay V1 (not illustrated). The dial tone is in known manner transmitted to the calling line N11. The transmission of the dialed selection impulses to the exchange, is effected by the relays X1 and S. The relay V (not illustrated) is slow-to-release and therefore remains operated during the impulse transmission. Ringing tone or busy tone, is likewise in known manner transmitted to the calling line. The release of the connection is in known manner effected upon conclusion of the call, for example, responsive to replacement of the receiver at the calling PBX station N11.

(F) *Incoming Exchange Call and Switching Through to a PBX Line, for example, Line N31.*—In the case of a call coming from the exchange over the exchange trunk line AL (FIG. 3*b*), relay A1 will be energized, completing at its contact 173a1 a circuit for relay H:

(78) +, 171as, 172d, 173a1, H, —

The energization of relay H effects disconnection of a relay B (not shown), which designated the exchange transmission A–Ue1 as being idle, and another idle exchange transmission is placed in readiness for other outgoing and incoming exchange calls. The relay H is held operated over a contact 174b of the not illustrated, disconnected relay B, in the circuit:

(79) +, 171as, 172d, 174b, H, —

The relay A1 produces a pulsing call signal to designate at an idle PBX operator station the incoming exchange call. Upon actuation, by the corresponding operator, of a key 175AT (FIG. 3*b*), the relay AS will be energized, such relay actuating its contacts 176as and 177as to connect the exchange trunk AL with the operator position AP. Upon obtaining the corresponding information, the operator actuates in known, not illustrated manner, the key 176V (FIG. 3*b*), thereby establishing a circuit for the energization of relay VS. The operator dials the desired PBX line number, for example, N31, or sets such number on a keyboard, thus marking the desired number in a storer, thereby effecting, in not illustrated manner, in the marker M (FIG. 1*b*) actuation of the relays Z3 and E1. A seizure relay allocated to the operator position, is energized in the finder SU (FIGS. 2*a* and 2*b*). It is for the sake of simplicity assumed that the relay BH is energized. The connection is established in accordance with the operations described respectively under the headings C and D. The exchange coupling relay AK3 (FIG. 3*a*) is energized in the manner of the line coupling relay LK3 (FIG. 2*b*). The relays AB (FIG. 2*a*), FB and AUF (FIG. 3*a*) are, for the marking of the authorization of the called PBX line N31 (FIG. 1*b*), energized in accordance with the operations described under the heading B, responsive to the energization of the marker relays Z3 and E1 of the central marker M (FIG. 1*b*).

The relays PR2 and W, in the exchange transmission A–Ue1 (FIGS. 3*a* and 3*b*), are energized, and if the desired line N31 is idle, the relay CH is also energized. The relay TG, which is energized over the winding II by the actuation of contact 170ch (circuit 77), initiates, as already described, the release of the seized central devices, namely, the finder SU (FIGS. 2*a* and 2*b*) and the marker M (FIG. 1*b*), and also the release of the storers (not shown) allocated to the operator positions. Ringing of the called line is effected in known manner.

The following relays are energized in the exchange transmission A–Ue1 (FIGS. 3*a* and 3*b*), namely, the relays AS, VS and CH. The exchange coupling relay AK3 (FIG. 3*a*) is also energized. The cutoff relay T31 in the line circuit TS31 (FIG. 1*b*) is likewise energized.

Relay X1 (circuit 74) and S (circuit 75) are energized when the desired party at the line N31 answers the call, and the relay V (not shown) is likewise energized. Ringing current is disconnected. The operator talks with the party at line N31 and thereupon restores the keys 175AT and 176AT (FIG. 3*b*), relays AS and VS restoring to normal, thereby switching the connection between the exchange trunk AL (FIG. 3*b*) and the PBX line N31 through over the contacts 176*as* and 177*as*. The respective parties can now converse. Relays X1, S and C*h* of the exchange transmission remain energized.

The relays X1 (circuit 74) and S (circuit 75) and also the slow-to-release relay V1 (not illustrated), in the exchange transmission, are released upon initiation of the release of the connection, for example, responsive to replacement of the receiver at the PBX line N31. Relay V2 is energized, in the interval after restoration of the contacts of relay S while the contacts controlled by the relay V1 are still actuated, in the circuit:

(80) +, 179*tr*2, 180*s*, 181*v*1, V2, —

Relay V2 is slow-to-release due to the capacitor connected parallel therewith. The cutoff relay TR2 is now in the indicated manner actuated in the circuit:

(81) +, 183*h*1, 184*v*1, 185*v*2, TR2, —

The finder SU seized, responsive to the actuation of a contact (not shown) of the relay TR2, so as to reserve the finder for a short interval for the re-testing operation. An impulse for initiating the retesting is now transmitted over the conductor *c*11 and contacts 186*tr*2 and 187*b*1. This impulse effects, in a transmission in which the testing of the corresponding busy line had been initiated, the energization of the respective NP relay, and therewith the re-testing operation as described under the heading D. The relay B1 is in not illustrated manner restored responsive to the restoration of the contacts of the relays V1 and V2. Opening of the contact 188*tr*2 effects restoration of the relay CH (circuit 73) and of the exchange coupling relay (circuit 69). The relay B1 (not shown) is energized again. The exchange transmission is now again available for another call.

(G) *The Desired PBX Line Is Busy Upon Receipt of an Exchange Call.*—Assuming that the PBX line N31 (see also explanations under the heading F) is found to be busy by the PBX operator attempting to extend an exchange call thereto, the relays AS, VS and W of the exchange transmission A–U*e*1, and also the exchange coupling relay AK3, will be energized. The operator disconnects its position by restoring the keys 175AT and 176V, thereby causing the relays AS and VS to restore. The relay NP2, in the exchange transmission A–U*e*1, which initiates the re-testing, is connected to the conductor *c*31. If the line N31 is idle, the relay NP2 is, responsive to the impulse which initiates the re-testing and which is transmitted, for example, from the house transmission H–U*e*1 (FIGS. 2*a* and 2*b*), operatively connected in the circuit:

(82) +(FIG. 3), 189*w*, NP2, 190*np*2, 161*pr*2, 194*ak*3, *c*31—*conductor*, 971*k*3, 269*tr*1, —

The contact 195*np*2 (FIG. 3*a*) transmits over conductor *np* a signal to the finder SU (FIGS. 2*a* and 2*b*), and the testing for the idle condition of the PBX line N31 is again effected responsive to the actuation of the relay NP1 of the finder.

Relay CH in the exchange transmission A–U*e*1 energizes (circuit 73). The ringing of the line N31 is effected in known manner. The further operations taking place when the party on the line N31 answers the call, and incident to the release of the connection, have been described under the heading F.

The PBX operator can at any time enter into the connection by depressing the key V.

(H) *The PBX Station N11 Effects a Call-back Connection With the PBX Station N31.*—The connection of the PBX line N11 with a desired exchange line is effected according to the operations described under the heading E. During such connection, there are actuated, in the line circuit TS11 (FIG. 1*a*), the cutoff relay T11, and in the exchange transmission A–U*e*1 (FIGS. 3*a* and 3*b*), the relays CH, X, S and the not illustrated relay V1. The exchange coupling relay AK1 (FIG. 3*a*) is also energized.

Actuation of the grounding key 196ET1, by the party at the PBX station N11, short circuits the relay X1 in the exchange transmission (circuit 74), such relay X1 releasing and restoring to normal contact 168*x*1, thereby establishing a circuit for the actuation of relay Z:

(83) +, 168*x*1, Z(I), 197*s*, —

Relay Z remains operated in a holding circuit:

(84) +, 198*v*1, 199*z*, Z(II), —

Relay X1 energizes again (circuit 74) upon release of the grounding key 196ET1 at the PBX station N11. A circuit is now established for the relay Y1:

(85) +, 293*um*1, 201*x*1, 202*y*, 203*z*, Y1, —

The relay V1 remains operated in the circuit:

(86) +, 198*v*1, 199*z*, 200*y*1, Y1, —

The relay R is now over a call-back device (not shown) operatively connected in the circuit:

(87) +, . . ., *ar*—conductor (FIG. 3), 204*y*1, 205*s*, R, 206*y*1, 207*y*1, *br*—conductor, . . ., —

A relay RR included in the seized call-back device is now energized, actuating its contact 208*rr*, thereby initiating the identifying device J*d* (FIGS. 1*a* and 1*b*) the operative connection of the relays JZ3, ZH, JE3, JH and WB as described under the heading A. The finder SU is seized again and the exchange transmission A–U*e*1, now taking the place of a station, is as described under the heading A connected with an idle house transmission H–U*e*1, over the call-back device (not shown) and the input coupler EK (for example, coupling relay EKR1). The switching through to the house transmission H–U*e*1 is effected over the call-back coupling points 240*ekr*1 to 243*ekr*1. The connection with the line N31 is effected as described under the heading B, responsive to dialing of the number of the PBX line N31, by the calling-back party at the line N11.

(K). *Switching-over an Exchange Connection.*—Assuming that the PBX line N11 is over the exchange trunk AL connected with an exchange subscriber station, as described respectively under the headings E and F, the following relays will be energized in the exchange transmission, namely, the relays C. X1, S and the not illustrated V. Upon extending a call-back connection as described under the heading H, from the line N11 to another PBX line, for example, line N31, there will be energized, in the exchange transmission, the relays C, X1, S, Z, Y1, R and the not illustrated V1. No central device is held in this connection.

Actuation, at the recalled line N31, of the grounding key 208ET31 (FIG. 1*b*), will effect in the house transmission H–U*e*1, disconnection of the relay Y and energization of the relay X, in the circuit:

(88) + (FIG. 1), 208ET31, *a*31—conductor (FIG. 2), 1071*k*3, *a*2—conductor, 108*d*, 101*ph*, Ü (III), 109*y*, X, —

The following relays are now energized in the house transmission, namely, the relays C, A, CC1, PH, X and V.

The relay R in the exchange transmission is during the call-back connection held in the circuit:

(89) + (FIG. 2), 56*x*, 57*u*, Ü (II), 58*d*, 129*kz*1, *b*1—conductor, 241*ekr*1, . . ., *br*—conductor (FIG. 3), 207*y*1, 206*y*1, R, 205*s*, 204*y*1, *ar*—conductor, . . ., 240*ekr*1 (FIG. 2), *a*1—conductor, 129*kz*1, Ü (I)*g*, 11, —

This circuit 89 is interrupted responsive to opening of the contact 56*x* (FIG. 2*a*), upon actuation of the grounding key 208ET31 (FIG. 1*b*), and the relay A (FIG. 2*a*) is held in the circuit:

(90) +, 56*x*, A, —

The relay R in the exchange transmission (circuit 89) is released and marks in such exchange transmission the inception of the key operation. The relay AUF is held in the exchange transmission in a manner not illustrated. There is now established a circuit, during the call-back connection, namely:

(91) +, 209*z*, 211*r*, 210*tt*, AUF(II), —

Restoration of the relay R establishes for the relay AUF the circuit:

(92) +, . . ., 209*z*, 211*r*, 212*auf*, G22, AUF(II), —

Relay TT is now energized in the circuit:

(93) +, . . ., 209*z*, 211*r*, 212*auf*, G23, TT, —

The relay V1 is energized in not illustrated manner, Relay TT therefore is held energized in a circuit:

(94) +, . . ., 213*v*1, 214*tt*, TT, —

The relay U (FIG. 2*a*) in the house transmission H–U*e*- is now energized by connecting minus potential to the conductor *b* over contact 215*tt*:

(95) + (FIG. 2), 209*tr*1, U, Ü (II), 58*d*, *b*1—conductor, 241*ekr*1, . . ., *br*—conductor (FIG. 3), 207*y*1, 215*tt*

The potential connected to the conductor *b* signifies that the house transmission H–U*e*1 has been seized by the exchange transmission for purposes of a call-back or recall. The relay U is not energized by actuation of the grounding key at a calling line. The following circuit is established for the relay UM2 of the house transmission:

(96) +, 137*c*, 138*u*, UM2, —

The relay UM2 is held energized in the circuit:

(97) +, 137*c*, 234*um*2, UM2, —

The cutoff relay T31 in the PBX line circuit TS31 is held operated over contact 271*u*.

Upon release of the grounding key 208ET31 (FIG. 1*b*) at the PBX line N31, relay X (circuit 88) is disconnected and relay Y (circuit 47) is again energized. Relays A (FIG. 2*a*) and R (FIG. 3*a*) are energized again in the circuit 89.

The relay AUF in the exchange transmission (circuit 91) is disconnected by the contacts 219*tt* and 211*r*, and another seizure signal is over the contacts 217*r* and 218*tt* transmitted to the finder SU. If the finder SU is idle, the relay UM thereof will be actuated in the circuit:

(98) +, 216*z*, 217*r*, 218*tt*, UM(1), 219*h*1, 220*a*2, —

Relay UM is held in the following circuit in which is also included the relay A1, namely:

(99) +, 221*tg*, 222*h*1, 223*a*1, 224*g*, A1, 225*um* (II), —

The relays UM and A1 are held in the circuit:

(100) +, 221*tg*, 222*h*1, 223*a*1, A1, 225um, UM(II), —

The relay UM1 of the exchange transmission A–U*e*1 is now energized in the circuit:

(101) +, 236*a*2, 237*um*, 264*pa*1, 288*r*, UM1, —

The relay PA1 in the finder S*u* is upon closure of the contact 228*um*1 energized in the circuit:

(102) +, PA1, (I), 151*a*2, 226*r*, 227*tt*, 228*um*1, 229*a*1, —

The relay PA1 is held in the following circuit, in which is also included the relay A2, namely:

(103) +, 130*h*2, 231 *a*1, A2, 232*pa*1, PA1(II), —

The relay E1 (FIG. 2*a*) of the finder SU is energized over contact 32*a*2. The relay PR is likewise energized, and the relay PR2 of the exchange transmission is energized in the circuit 66.

The circuits 84 and 86 for the relays Z and Y1 are interrupted at the contact 239*um*1. The relay CH (circuit 73) is disconnected by the contact 241*um*1. The circuit 75 for the relay S and the circuit 101 for the relay UM1, are interrupted. The relay X1 (circuit 74) is also disconnected. The circuit 89 for the relays R (FIGS. 3*a*), A and U (FIG. 2*a*) are interrupted. The relay TT (circuit 94) of the exchange transmission, is likewise disconnected.

The seized house transmission H–U*e*1 is released responsive to restoration of the contacts 204*y*1 and 207*y*1 (FIG. 3*a*) and disconnection of the relays A and U (FIG. 2*a*). The relay U of the house transmission is disconnected while the contacts of the relay UM2 are, owing to the slow-to-release feature of the relay, still in operated position. A voltage impulse is transmitted to the PBX line circuit TS31 over the conductor *a*2 and contacts 272*um*2, 252*x* and 253*u*, and the PBX line relay R31 is energized. The cutoff relay T31 is disconnected because contacts 271*u* and 110*um*2 (FIG. 2*a*) are open. The PBX line N31 is again identified. The relays U, C, PH, V, X and UM2 of the house transmission, are restored. The connection of the PBX line N31 with the exchange trunk line AL (FIG. 3*b*) is prepared by the oprative connection of the relays Z3 and E1 (FIG. 1*b*) of the marker M.

Since the line relay R31 in the PBX line circuit TS31 is energized and since the marker M has marked the PBX line N31 by the actuation of the contacts 86*z*3 and 85*e*1 (FIG. 1*b*), the relay AK3 will be energized in the circuit:

(104) + (FIG. 3), 150*pr*, 151*pa*1, G24, AK3(I), *e*31—conductor (FIG. 1), 85*e*1, 86*z*3, *g*—conductor (FIG. 2), 48*e*, K1, —

A holding circuit is established for the relay AK3, in which is also included the relay W, namely, the circuit:

(105) + (FIG. 3), 152*pr*2, G18, W, 153*tr*1 154*um*1, 155*ch*, 156*ak*3, AK3(II), *d*31—conductor (FIG. 1), —

The relay S*p*1 is operatively connected by the contact 233*a*1.

The authorization of the PBX line N31, to take over the exchange connection, is marked by the renewed connection of the relays Z3 and E1 of the marker M (FIG. 1*b*).

The relay AB is energized in the circuit 21. The following circuit is completed for the relay AUF, namely:

(106) +, 91*z*3, 92*e*1, G13, *as*4—conductor (FIG. 3*a*), AUF(I), 157*pr*2, —

The evaluation of the authorization is effected in known manner. The relay AUF is for the duration of the connection held in operated condition in a manner not illustrated in the drawing.

In the event that the PBX line N31 is not authorized to make outside (exchange) calls, a relay NA (not illustrated will prevent the actuation of the relay BA and the function of the relay TG, thus preventing the connection of such PBX line with the exchange transmission A–U*e*1.

The relays UM, A1, PA1, A2, E2, BA and S*p*1 are now energized in the finder SU. Upon connection of the PBX line 31 with the exchange trunk line AL, relay X1 (FIG. 3*a*) will energize over the loop of such PBX line, in a circuit similar to the circuit 74. Circuit 75 is established for the relay S. The relay V1 is energized in a circuit not illustrated in the drawings. The cutoff relay P31 of the PBX line N31 is energized in the circuit 77. The seized central devices, that is, the finder SU (FIGS. 2*a* to 3*a*), the marker M and identifier J*d* (FIGS. 1*a* and 1*b*), are released in accordance with the operations described under the heading E.

The cutoff relay T31, in the PBX line circuit TS31 (FIG. 1*b*), the exchange coupling relay AK3, in the exchange coupler (FIG. 3*a*) and the relays CH, X1, S as well as the functionally described but not illustrated relay V1, in the exchange transmission A–U*e*1 (FIGS. 3*a* and 3*b*) maintain the connection between the PBX line N31 and the exchange trunk line AL. The party on the PBX line N31 is now connected with party on the exchange line. The further operations, for example, call-back, switching-over and release are effected in the manner already described.

The contact 56*x* (FIG. 2*a*) in the house transmission circuit prevents operative connection of the relay U, responsive to the actuation of the grounding key at a calling PBX line, for example, N11 in FIG. 1*a*, incident to a house call, thus preventing initiation of a renewed marking of the calling line. While the relay X is also energized responsive to the actuation of the grounding key at a called PBX line, in the case of a house call, the operative actuation of the contact 56*x* cannot become effective because the house transmission H–U*e*1 is not connected over the call-back path with an exchange transmission. The relay U does not receive a voltage impulse over the conductor *br* and therefore cannot initiate the renewed identification of the called PBX line N31. The actuation of the contact 56*x* becomes effective only responsive to the operation of the grounding key at a recalled PBX line, for example, line N31, to bring about disconnection, in the seized exchange transmission, of the relay R connected in a circuit between the line conductors (FIG. 3*b*) and to cause over the contact 215*tt*, controlled by the relay TT which had been energized responsive to the actuation of the relay R, transmission of a voltage impulse over the conductor *br*, such impulse resulting in the energization of the relay U (FIG. 2*a*) in the house transmission. This voltage impulse placed on the *br*-conductor by the contact 215*tt* serves as an acknowledgement that the house transmission is occupied over the call-back path.

The relay TT (FIG. 3*b*) causes, as described before, the connection of the finder SU with the seized exchange transmission. Relay U (FIG. 2*a*) of the house transmission causes energization of the relay UM2, the latter relay effecting the renewed energization of the line relay R31 of the PBX line N31, by transmitting a voltage impulse over the *a*-conductor in a circuit involving actuated contact 272*um*2 and contact 253*u* (FIG. 2*b*) in the normal position thereof. The energization of the line relay R31 effects the identification and authorization marking of the PBX line N31 which is, as already described, connected with the waiting exchange trunk line AL by the energization of the exchange coupling relay AK3 (FIG. 3*a*).

The relay TT (FIG. 3*b*) which is part of the seized exchange transmission, and affected by the switch-over signal, also causes, as described in connection with circuit 98, actuation of the relay UM of the central device or finder SU. The actuation of the relay UM, as described in connection with circuits 98 to 104, initiates the release of the path leading to the recalling PBX line N11 (which placed the call-back) and also the release of the path leading to the recalled PBX line N31. The relay UM controls the relay A1 and A2 of the central device S*u*. Since the relay TT of the exchange transmission has likewise transmitted, over the conductor *br*, a signal for initiating the identification and authorization check with respect to the recalled PBX line N31, the authorization relay AB of the central device SU will after the identification of the respective line be energized in previously described manner, thereby marking the authorization of the PBX line N31, thus also marking in the central device that the recalled PBX line N31 has been prepared. The relay BA is now operatively controlled by the relay AB and the relay PR is operatively controlled by the relays A2 and BA. This assures, with given time requirements satisfied, operative actuation of the exchange coupling relay AK3 (FIG. 3*a*) only after the release of the paths leading respectively to the recalling PBX line N11 and to the recalled PBX line N31.

Changes may be made within the scope and spirit of the appended claims which define what is believed to be new and desired to have protected by Letters Patent.

We claim:

1. A circuit arrangement for a relay controlled PBX telephone system, wherein the transfer of an exchange line to a called-back PBX line is initiated, over an exchange transmission circuit, by a switching operation effected at a PBX line, comprising switching means, in the respective exchange transmission circuit, said switching means being operatively affected by a transfer signal extended respectively from a calling back or from a called-back PBX line, central control means for identifying the called-back PBX line, an exchange coupling relay, means governed from said exchange transmission circuit, responsive to actuation of said switching means, for governing the operation of said central control means, and means governed by said central control means for controlling the operative actuation of said exchange coupling relay.

2. A circuit arrangement according to claim 1, wherein said switching means comprises a relay, and circuit means governed by said relay for transmitting over a conductor of a PBX connection a signal for initiating the identification of the recalled PBX line.

3. A circuit arrangement according to claim 2, wherein said signal is a potential placed on said conductor, a house transmission circuit including a control relay which is operatively responsive to said potential, said control relay initiating the identification of the called-back line.

4. A circuit arrangement according to claim 3, comprising a further relay, in said house transmission circuit, which is operatively responsive to a ground signal extended from a PBX line, a contact operated by said further relay, means for connecting said contact in parallel with said control relay, said control relay being solely operatively effective responsive to the connection of said potential placed on said conductor.

5. A circuit arrangement according to claim 1, wherein said switching means comprising relay means disposed in said exchange transmission circuit, means governed by said relay means for controlling the operation of a relay disposed in said central control means, said last named relay preparing circuit means for the actuation of said exchange coupling relay to effect connection of the recalled PBX line.

6. A circuit arrangement according to claim 1, wherein said switching means in said exchange transmission circuit comprises a relay, means governed by said relay for transmitting over a conductor of a PBX connection a control signal for initiating the identification and also the authorization of the recalled PBX line for exchange calls.

7. A circuit arrangement according to claim 1, wherein said switching means in said exchange transmission circuit comprises a relay, another switching means in said central control means for initiating the release of the connection path leading to the recalled PBX line, and means governed by said relay for controlling the operation of said other switching means.

8. A circuit arrangement according to claim 7, comprising further switching means forming part of said central control means, said further switching means being operative to effect the actuation of said exchange coupling relay only after release of the paths leading respectively to the recalling and to the recalled PBX lines.

(References on following page)

References Cited by the Examiner

UNITED STATES PATENTS

| | | | |
|---|---|---|---|
| 2,020,816 | 11/1935 | Voss et al. | 179—18 |
| 2,358,185 | 9/1944 | Pearce et al. | 179—18 |
| 2,468,040 | 4/1949 | Cohrt | 179—18 |
| 2,958,734 | 11/1960 | Forrest | 179—18 |

FOREIGN PATENTS

| | | |
|---|---|---|
| 1,074,666 | 2/1960 | Germany. |

ROBERT H. ROSE, *Primary Examiner.*

WILLIAM C. COOPER, *Examiner.*